United States Patent
Mao et al.

(10) Patent No.: US 10,951,905 B2
(45) Date of Patent: Mar. 16, 2021

(54) VIDEO TRANSCODING METHOD, COMPUTER DEVICE, AND STORAGE MEDIUM

(71) Applicant: Tencent Technology (Shenzhen) Company Limited, Shenzhen (CN)

(72) Inventors: Xunan Mao, Shenzhen (CN); Haixu Han, Shenzhen (CN); Xinwei Gao, Shenzhen (CN); Chenchen Gu, Shenzhen (CN); Jian He, Shenzhen (CN); Jingchang Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/436,570

(22) Filed: Jun. 10, 2019

(65) Prior Publication Data

US 2019/0320193 A1 Oct. 17, 2019

Related U.S. Application Data

(63) Continuation of application No. PCT/CN2018/093318, filed on Jun. 28, 2018.

(30) Foreign Application Priority Data

Oct. 10, 2017 (CN) .......................... 201710937011.6

(51) Int. Cl.
*H04N 19/40* (2014.01)
*H04N 19/124* (2014.01)
(Continued)

(52) U.S. Cl.
CPC ........... *H04N 19/40* (2014.11); *H04N 19/124* (2014.11); *H04N 19/136* (2014.11); *H04N 19/172* (2014.11); *H04N 19/196* (2014.11)

(58) Field of Classification Search
None
See application file for complete search history.

(56) References Cited

U.S. PATENT DOCUMENTS 5,677,969 A * 10/1997 Auyeung ......... H04N 21/23406
358/1.9
8,295,343 B2 * 10/2012 Tong .................... H04N 19/172
375/240.03
(Continued)

FOREIGN PATENT DOCUMENTS

CN 101888542 A 11/2010
CN 101924943 A 12/2010
(Continued)

OTHER PUBLICATIONS

Search Report IP.com.*
(Continued)

*Primary Examiner* — Mohammad J Rahman
(74) *Attorney, Agent, or Firm* — Oblon, McClelland, Maier & Neustadt, L.L.P.

(57) ABSTRACT

A video transcoding method is described. A computer device obtains at least one initial quantization parameter used to encode at least one initial coding unit for generating an initial compressed video, and determines, according to the at least one initial quantization parameter, a current reference quantization parameter corresponding to a current coding unit in a current video frame that is generated by decoding the initial compressed video. The computer device determines an estimated quantization parameter for encoding the current coding unit, determines a first difference between the current reference quantization parameter and the estimated quantization parameter, and sets a target quantization parameter to be equal to or greater than the estimated quantization parameter according to the first difference. The computer
(Continued)

device encodes the current coding unit according to the target quantization parameter.

21 Claims, 11 Drawing Sheets

(51) Int. Cl.
   *H04N 19/196*   (2014.01)
   *H04N 19/136*   (2014.01)
   *H04N 19/172*   (2014.01)

(56) References Cited

U.S. PATENT DOCUMENTS

| | | | | |
|---|---|---|---|---|
| 8,982,947 B2* | 3/2015 | Au | ........................ | H04N 19/176 |
| | | | | 375/240.03 |
| 2002/0054638 A1* | 5/2002 | Hanamura | ............. | H04N 19/40 |
| | | | | 375/240.03 |
| 2004/0146103 A1* | 7/2004 | Chang | ................... | H04N 19/107 |
| | | | | 375/240.03 |
| 2005/0123050 A1* | 6/2005 | Kondo | ................... | H04N 19/61 |
| | | | | 375/240.16 |
| 2007/0274396 A1* | 11/2007 | Zhang | .................. | H04N 19/176 |
| | | | | 375/240.24 |
| 2009/0086816 A1* | 4/2009 | Leontaris | ............... | H04N 19/15 |
| | | | | 375/240.03 |
| 2010/0232498 A1* | 9/2010 | Liu | ...................... | H04N 19/149 |
| | | | | 375/240.03 |
| 2011/0200266 A1* | 8/2011 | Fuchie | ................... | H04N 19/13 |
| | | | | 382/251 |
| 2012/0002728 A1 | 1/2012 | Eleftheriadis et al. | | |
| 2012/0269258 A1* | 10/2012 | Yang | .................... | H04N 19/172 |
| | | | | 375/240.02 |
| 2013/0322528 A1* | 12/2013 | Fuchie | ................. | H04N 19/149 |
| | | | | 375/240.07 |
| 2013/0330012 A1* | 12/2013 | Sato | ..................... | H04N 19/463 |
| | | | | 382/233 |
| 2016/0173875 A1* | 6/2016 | Zhang | .................. | H04N 19/436 |
| | | | | 375/340.03 |
| 2018/0288356 A1* | 10/2018 | Ray | ....................... | H04N 19/124 |

FOREIGN PATENT DOCUMENTS

| | | |
|---|---|---|
| CN | 102685478 A | 9/2012 |
| CN | 102685485 A | 9/2012 |
| CN | 103329536 A | 9/2013 |
| CN | 103458239 A | 12/2013 |
| CN | 103763559 A | 4/2014 |
| CN | 104717507 A | 6/2015 |
| CN | 105992004 A | 10/2016 |
| CN | 106488227 A | 3/2017 |
| CN | 107087190 A | 8/2017 |
| JP | 7-312756 | 11/1995 |
| JP | 2005-252609 | 9/2005 |
| JP | 2015-186120 | 10/2015 |

OTHER PUBLICATIONS

Search Report Google.*
International Search Report dated Sep. 27, 2018 in WIPO Patent Application No. PCT/CN2018/093318 with translation.
Written Opinion dated Sep. 13, 2018 in WIPO Patent Application No. PCT/CN2018/093318.
Office Action dated Nov. 30, 2020 in Japanese Application No. 2019-561246, with concise English translation, citing documents AL-AK therein.
Office Action dated Nov. 18, 2020 in Chinese Application No. 201710937011.6, with concise English translation, citing documents AA, AL-AV therein.

* cited by examiner

VIDEO TRANSCODING METHOD, COMPUTER DEVICE, AND STORAGE MEDIUM

RELATED APPLICATION

This application is a continuation of International Application No. PCT/CN2018/093318, filed on Jun. 28, 2018, which claims priority to Chinese Patent Application No. 201710937011.6, filed on Oct. 10, 2017. The entire disclosures of the prior applications are hereby incorporated by reference in their entirety.

FIELD OF THE TECHNOLOGY

This application relates to the field of computer processing technologies, and in particular, to a video transcoding method, a computer device, and a storage medium.

BACKGROUND OF THE DISCLOSURE

Video transcoding refers to converting a video bitstream on which compression coding has been performed to another video bitstream, such that the video bitstreams can be adapted to different network bandwidths, different terminal processing capabilities, and/or different user requirements. In some applications, a transcoding process includes first decoding an initial video bitstream and then encoding the decoded video into an output video bitstream. The initial video bitstream before the transcoding and the output video bitstream after the transcoding may be coded using different video coding standards.

In some applications, a client uploads a compressed video to a server, and the server transcodes the received video. In at least one related video transcoding method, the output video bitstream after the transcoding may still have a high demand for bandwidth resources.

SUMMARY

Embodiment of this application provide a video transcoding method, a computer device, and a storage medium.

According to one or more embodiments described in this disclosure, a video transcoding method includes obtaining, by a computer device, an initial quantization parameter corresponding to encoding an initial coding unit for generating an initial compressed video, and determining, by the computer device according to the initial quantization parameter corresponding to the initial coding unit, a current reference quantization parameter corresponding to a current coding unit in a current video frame. The method includes determining, by the computer device, an estimated quantization parameter corresponding to the current coding unit, determining, by the computer device, a difference between the estimated quantization parameter corresponding to the current coding unit and the current reference quantization parameter corresponding to the current coding unit, and setting a target quantization parameter according to the difference. Finally, the method includes encoding, by the computer device, the current coding unit according to the target quantization parameter.

According to one or more embodiments described in this disclosure, a computer device includes a memory and one or more processors, the memory storing computer-readable instructions, which when the computer-readable instructions being executed by the one or more processors, the one or more processors being caused to perform a method. The method includes obtaining an initial quantization parameter corresponding to an initial coding unit for generating an initial compressed video, and determining, according to the initial quantization parameter corresponding to the initial coding unit, a current reference quantization parameter corresponding to a current coding unit in a current video frame. The method includes determining an estimated quantization parameter corresponding to the current coding unit, determining a difference between the estimated quantization parameter corresponding to the current coding unit and the current reference quantization parameter corresponding to the current coding unit, and setting a target quantization parameter according to the difference. The method further includes encoding the current coding unit according to the target quantization parameter.

According to one or more embodiments described in this disclosure, one or more computer-readable non-volatile storage mediums storing computer-executable instructions is provided. The computer-executable instructions when being executed by one or more processors cause the one or more processors to perform a method that includes obtaining an initial quantization parameter corresponding to an initial coding unit for generating an initial compressed video, and determining, according to the initial quantization parameter corresponding to the initial coding unit, a current reference quantization parameter corresponding to a current coding unit in a current video frame. The method includes determining an estimated quantization parameter corresponding to the current coding unit, determining a difference between the estimated quantization parameter corresponding to the current coding unit and the current reference quantization parameter corresponding to the current coding unit, and setting a target coding quantization parameter according to the difference. The method further includes encoding the current coding unit according to the target quantization parameter.

Aspects of the disclosure provide a video transcoding method. According to the video transcoding method, a computer device obtains at least one initial quantization parameter used to encode at least one initial coding unit for generating an initial compressed video, and determines, according to the at least one initial quantization parameter, a current reference quantization parameter corresponding to a current coding unit in a current video frame that is generated by decoding the initial compressed video. The computer device determines an estimated quantization parameter for encoding the current coding unit, determines a first difference between the current reference quantization parameter and the estimated quantization parameter, and sets a target quantization parameter to be equal to or greater than the estimated quantization parameter according to the first difference. The computer device encodes the current coding unit according to the target quantization parameter.

Aspects of the disclosure provide a computer device. The computer device includes processing circuitry configured to obtain at least one initial quantization parameter used to encode at least one initial coding unit for generating an initial compressed video, and determine, according to the at least one initial quantization parameter, a current reference quantization parameter corresponding to a current coding unit in a current video frame that is generated by decoding the initial compressed video. The processing circuitry is configured to determine an estimated quantization parameter for encoding the current coding unit, determine a first difference between the current reference quantization parameter and the estimated quantization parameter, and set a target quantization parameter to be equal to or greater than the estimated quantization parameter according to the first difference. The processing circuitry is further configured to encode the current coding unit according to the target quantization parameter.

Aspects of the disclosure provide a non-transitory computer-readable storage medium storing computer-readable instructions, which when executed by one or more processors, cause the one or more processors to perform at least the following operations. For example, at least one initial quantization parameter used to encode at least one initial coding unit for generating an initial compressed video is obtained, and a current reference quantization parameter corresponding to a current coding unit in a current video frame that is generated by decoding the initial compressed video is determined according to the at least one initial quantization parameter. Also, an estimated quantization parameter for encoding the current coding unit is determined, a first difference between the current reference quantization parameter and the estimated quantization parameter is determined, and a target quantization parameter is set to be equal to or greater than the estimated quantization parameter according to the first difference. Finally, the current coding unit is encoded according to the target quantization parameter.

Details of one or more embodiments of this application are provided in the following accompanying drawings and descriptions as non-limiting examples. Other features, objectives, and advantages of this application may be explicitly or implicitly illustrated in the specification, the accompanying drawings, and the claims.

BRIEF DESCRIPTION OF THE DRAWINGS

To describe the technical solutions in the embodiments of this application, the following briefly introduces the accompanying drawings for describing the embodiments of this application. The accompanying drawings in the following description merely show non-limiting embodiments of this application, and a person of ordinary skill in the art may derive other drawings and/or embodiments from these accompanying drawings.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe various aspects of this application, and are not for limiting the scope of this application.

Figure 1:
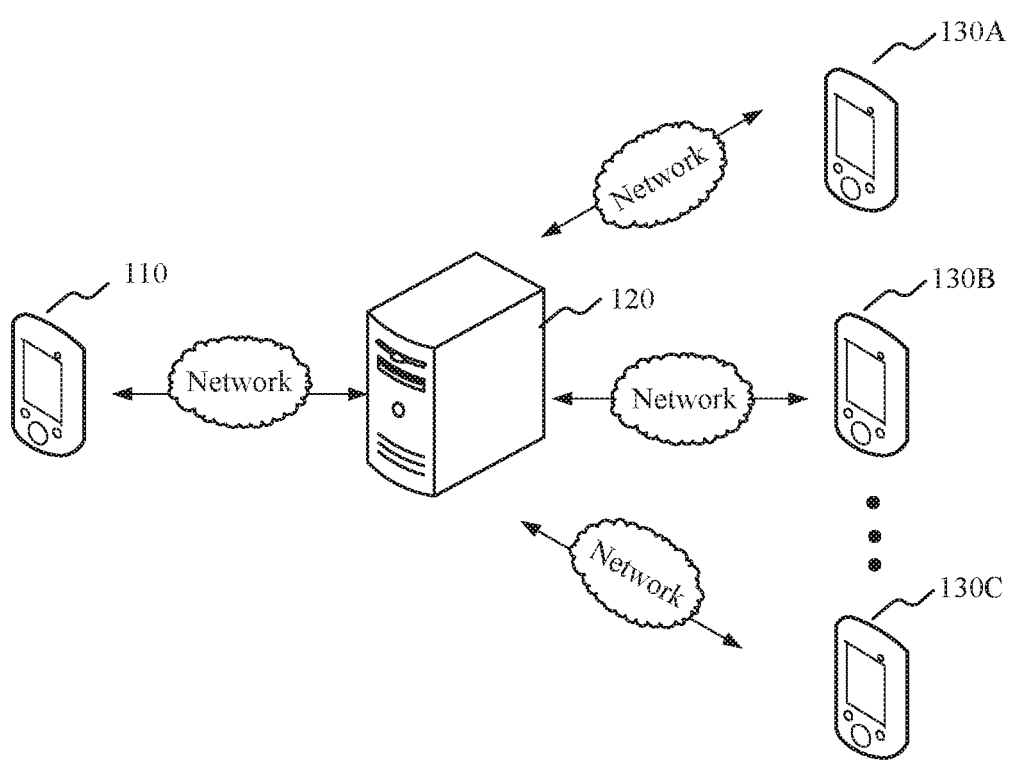
FIG. 1 is a diagram of an application environment of a video transcoding method according to an embodiment.

FIG. 1 is a diagram of an application environment of a video transcoding method according to an embodiment. Referring to FIG. 1, the video transcoding method is applied to a video transcoding system, and may be applied to a server in the video transcoding system or may be applied to a terminal in the video transcoding system. The video transcoding system includes a first terminal 110, a server 120, and one or more second terminals 130A, 130B, and 130C. The first terminal 110 and the server 120 are connected through a network, and the server 120 and the second terminals 1304-130C are connected through various networks or a network. The first terminal 110 and the second terminals 130A-130C may be desktop terminals or mobile terminals, and the mobile terminal may be a mobile phone, a tablet computer, a notebook computer, or the like. The server 120 may be implemented by an independent server or a server cluster formed by a plurality of servers. In an embodiment, the first terminal 110 first compresses an original video to obtain an initial compressed video, and then uploads the initial compressed video to the server 120. After receiving the initial compressed video, the server 120 obtains at least one initial quantization parameter used to encode at least one initial coding unit for generating the initial compressed video, determines, according to the at least one initial quantization parameter for the initial coding unit, a current reference quantization parameter corresponding to a current coding unit in a current video frame that is generated by decoding the initial compressed video, determines an estimated quantization parameter for encoding the current coding unit, determines a difference between the estimated quantization parameter and the current reference quantization parameter, sets a target quantization parameter to be equal to or greater than the estimated quantization parameter according to the difference, and encodes the current coding unit according to the target quantization parameter. Finally, a target compressed video obtained after transcoding may be sent to a second terminal, such as the second terminal 130A.

In another embodiment, the video transcoding method may be directly applied to the terminal 110 or 130A-130B. The terminal 110 or 130A-130B obtains an initial quantization parameter used to encode an initial coding unit when the initial compressed video is coded, determines, according to the initial quantization parameter used to encode the initial coding unit, a current reference quantization parameter corresponding to a current coding unit in a current video frame, determines an estimated quantization parameter for encoding the current coding unit, determines a difference between the estimated quantization parameter for encoding the current coding unit and the current reference quantization parameter corresponding to the current coding unit, sets a target quantization parameter to be equal to or greater than the estimated quantization parameter according to the difference, and encodes the current coding unit according to the target quantization parameter.

Figure 2:
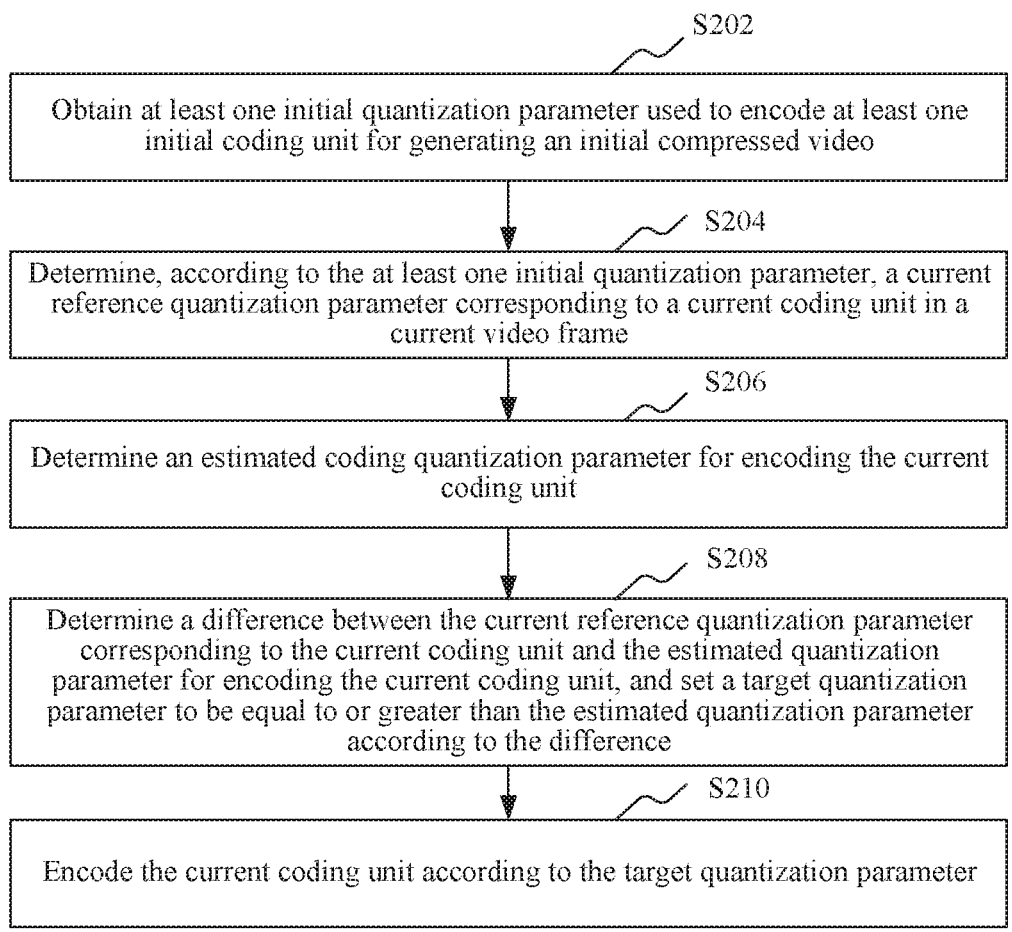
FIG. 2 is a flowchart of a video transcoding method according to an embodiment.

As shown in FIG. 2, in an embodiment, a video transcoding method is provided. The video transcoding method not only may be applied to a server but also may be applied to a terminal. This embodiment is described by using an example in which the method is applied to the server 120 in FIG. 1. Referring to FIG. 2, the video transcoding method includes at least the following operations.

Step S202: Obtain at least one initial quantization parameter used to encode at least one initial coding unit for generating an initial compressed video.

In an embodiment, a quantization parameter (QP) is a parameter used to measure a quantization step and can affect image quality. A smaller quantization parameter indicates that corresponding image quality is better. For example, in the H.264 video coding standard, a quantization parameter QP is recorded as an index of a quantization step (Qstep), and the index ranges from 0 to 51. When the quantization parameter QP is the smallest value 0, it indicates that quantization is finest. On the contrary, when the quantization parameter QP is the largest value 51, it indicates that quantization is coarsest. A quantization parameter and a compression rate are positively correlated, in some embodiments, a smaller quantization parameter indicates that a corresponding compression rate is smaller, and a larger quantization parameter indicates that a corresponding compression rate is larger. The compression rate herein is a ratio between a size before compression and a size after compression.

A video is formed by video frames, each video frame includes one or more coding units, and each coding unit corresponds to a quantization parameter for encoding the coding unit. A quantization parameter for encoding each coding unit can be calculated during the encoding process, and the corresponding coding unit is encoded according to the quantization parameter. The initial compressed video in this application refers to the source for performing a video transcoding process. The initial coding unit is a coding unit included in the initial compressed video, and the initial quantization parameter is a quantization parameter for encoding the initial coding unit.

The coding unit is a component for forming a video frame, and the coding unit may be a coding block in the video frame or may be a coding slice in the video frame. The coding slice includes a plurality of coding blocks. Because coding blocks in a coding slice correspond to a same quantization parameter, the coding slice may be considered as a coding unit in this application and corresponds to a quantization parameter.

In an embodiment, the initial compressed video is obtained and the initial compressed video is decoded, to obtain a decoded video frame, and an initial quantization parameter used to encode each initial coding unit is obtained.

Step S204: Determine, according to the at least one initial quantization parameter for encoding the at least one initial coding unit, a current reference quantization parameter corresponding to a current coding unit in a current video frame, which can be a decoded video frame that is generated by decoding the initial compressed video.

The current video frame is obtained by decoding the initial compressed video and is a current to-be-encoded video frame, and the current coding unit is a coding unit in the current video frame. The current reference quantization parameter is a reference value used to measure a quantization parameter for a region in the initial compressed video that corresponds to the current coding unit. Specifically, the essence of video transcoding is a process of first performing decoding and then performing encoding again. To transcode the initial compressed video, the initial compressed video is first decoded, to obtain the decoded video frame, and the decoded video frame is then used as a to-be-encoded current video frame, to facilitate a subsequent encoding process.

The current coding unit in the current video frame is obtained, and the current reference quantization parameter corresponding to the current coding unit is calculated according to the at least one initial quantization parameter used to encode the at least one initial coding unit. The current reference quantization parameter corresponding to the current coding unit can be calculated by using any of a plurality of methods. In some embodiments, the at least one initial coding unit includes a coding unit within a region that corresponds to the current coding unit in the current video frame. In an embodiment, a target initial coding unit matching the current coding unit is first obtained. Because the decoded video frame obtained by decoding is used as a current to-be-encoded video frame and is to be encoded, in some embodiments, the decoded video frame and the current to-be-encoded video frame have a one-to-one correspondence. In some embodiments, a type of the initial coding unit in the decoded video frame may be the same as or different from that of the current coding unit in the current to-be-encoded video frame. For example, when the initial coding unit is a coding block, the current coding unit may be a coding block or may be a coding slice. Regardless of whether the types of the current coding unit and the initial coding unit are the same, there is a corresponding matching relationship between the current coding unit and the initial coding unit. For example, if the current coding unit is a coding slice but the initial coding unit is a coding block, the current coding unit matches a plurality of corresponding initial coding units. In an embodiment, the target initial coding unit matching the current coding unit is first obtained, and the current reference quantization parameter corresponding to the current coding unit is then calculated according to an initial quantization parameter used to encode the target initial coding unit. In some embodiments, the initial quantization parameter used to encode the target initial coding unit may be subtracted by a value to obtain the current reference quantization parameter.

In another embodiment, the target initial decoded frame corresponding to the current video frame is obtained, initial quantization parameters used to encode initial coding units in the target initial decoded frame are obtained, the initial quantization parameters used to encode the initial coding units are sorted according to values to obtain a sorted result, and the current reference quantization parameter corresponding to the current coding unit is determined according to the sorted result.

Step S206: Determine an estimated coding quantization parameter for encoding the current coding unit.

In an embodiment, the to-be-encoded current coding unit is obtained, and an estimated quantization parameter for encoding the current coding unit is calculated. Because an encoding process relies on a quantization parameter for encoding the coding unit, before performing the encoding process, the estimated quantization parameter for encoding the coding unit is first calculated. Calculation of the estimated quantization parameter is related to factors such as the image complexity and the target bit rate. The estimated quantization parameter may be calculated by using a bit rate control algorithm, may be calculated by using an adaptive quantization parameter calculation method, or may be calculated by using another algorithm. Of course, calculation of the estimated quantization parameter is not limited to the methods or algorithms listed herein.

Step S208: Determine a difference between the current reference quantization parameter corresponding to the current coding unit and the estimated quantization parameter for encoding the current coding unit, and set a target quantization parameter to be equal to or greater than the estimated quantization parameter according to the difference.

In an embodiment, the difference is a difference between the current reference quantization parameter corresponding to the current coding unit and the estimated quantization parameter. According to the calculated difference, a target quantization parameter can be set by performing an increase adjustment on the estimated quantization parameter for encoding the current coding unit. The target coding quantization parameter is a quantization parameter that will be actually used for encoding the current coding unit.

In an embodiment, the current reference quantization parameter reflects a quantization parameter used when the initial coding unit is encoded, and the quantization parameter reflects image fineness of the initial compressed video. Because a compressed video instead of an original video is obtained as the source for transcoding, if the initial compressed video has undesirable quality, video quality cannot be further improved through applying a smaller quantization parameter during the transcoding process. Instead, applying a smaller quantization parameter during the transcoding process may only degrade the coding efficiency. Therefore, the current reference quantization parameter is used as a reference value to calculate the difference between the current reference quantization parameter and the estimated quantization parameter. When the difference is large, it indicates that the estimated quantization parameter may be unnecessarily small, and the target quantization parameter may be set by performing the increase adjustment on the estimated quantization parameter, where the adjustment can be determined according to the difference, to improve a compression rate. In an embodiment, an increase adjustment amount of the quantization parameter and the difference are positively correlated, and a larger difference indicates that an adjustment amount of the quantization parameter is larger. The estimated quantization parameter is properly increased according to the difference. Therefore, the method can improve a coding compression rate, avoid wasting a bit rate, and reducing corresponding bandwidth costs while ensuring subjective quality.

Step S210: Encode the current coding unit according to the target quantization parameter.

In an embodiment, the target quantization parameter is a final quantization parameter for encoding the current coding unit. In some embodiments, the current coding unit is coded according to the target quantization parameter obtained by adjusting the estimated quantization parameter as described in Step S208, to obtain a corresponding compressed video. Because an increase adjustment is performed on the estimated quantization parameter, this helps to improve a video compression rate and reduce a corresponding bit rate while ensuring subjective quality, thereby reducing corresponding bandwidth costs.

In an embodiment, to ensure that image quality corresponding to important content (referred to as "target content" below) in a video is not affected while a video compression rate is improved, a current to-be-transcoded video frame is recognized. If the current video frame includes the target content (for example, including content of a person's face), the increase adjustment is not performed on the estimated quantization parameter.

In the video transcoding method, the initial quantization parameter used to encode the initial coding unit when the initial compressed video is coded is obtained, the current reference quantization parameter corresponding to the current coding unit is determined according to the initial quantization parameter, increase adjustment is performed on the estimated quantization parameter according to the difference between the coding quantization parameter and the current reference quantization parameter, to obtain the target quantization parameter, and finally, the current coding unit is encoded according to the target quantization parameter. Therefore, increase adjustment is performed on the estimated quantization parameter while ensuring subjective quality, thereby helping improve compression efficiency and reducing bandwidth costs.

Figure 3:
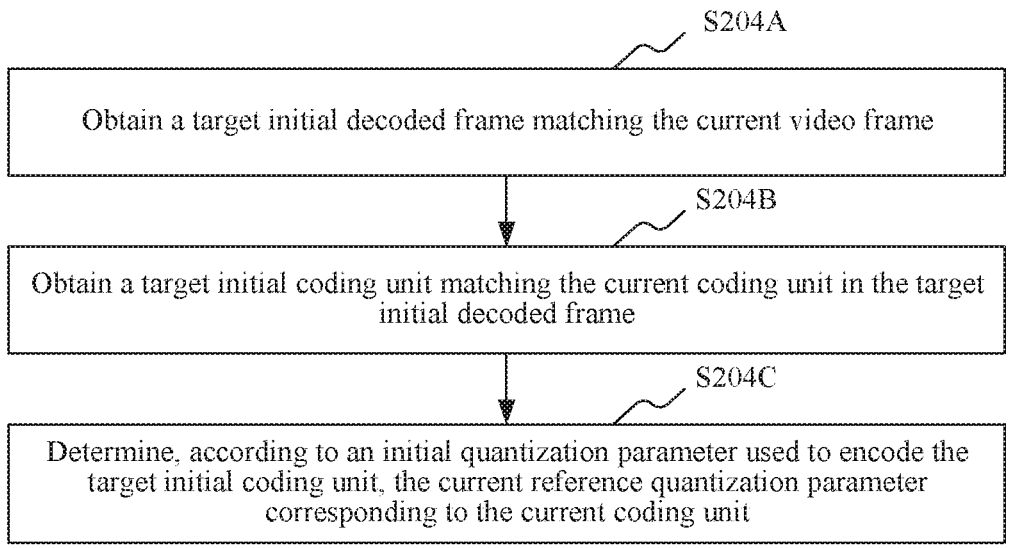
FIG. 3 is a flowchart of a method for determining a current reference quantization parameter corresponding to a current coding unit according to an embodiment.

As shown in FIG. 3, in an embodiment, step S204 in FIG. 2 regarding obtaining the current coding unit in the current video frame, and determining, according to the initial quantization parameter used to encode the initial coding unit, a current reference quantization parameter corresponding to the current coding unit can include the following operations.

Step S204A: Obtain a target initial decoded frame matching the current video frame.

In an embodiment, the initial decoded frame is a video frame obtained by decoding the initial compressed video. The target initial decoded frame is an initial decoded frame matching the current video frame. The current video frame is a current to-be-encoded video frame. Specifically, the server receives the initial compressed video and decodes the initial compressed video, to obtain the initial decoded frame, and uses the initial decoded frame as a to-be-encoded video frame to code the video again. Therefore, the to-be-encoded video frame and the initial decoded frame have a one-to-one correspondence. A matching relationship between the to-be-encoded video frame and the initial decoded frame may be self-defined. In an embodiment, the initial decoded frame corresponding to the current video frame may be directly used as the target initial decoded frame. In another embodiment, the current video frame and a plurality of initial decoded frames may be matched. For example, the current video frame, the corresponding initial decoded frame, and a neighboring decoded frame of the initial decoded frame are used as matched target initial decoded frames. For example, it is assumed that the initial compressed video is decoded to obtain six initial decoded frames, which are respectively 1, 2, 3, 4, 5, and 6. It is assumed that the current to-be-encoded video frame is 3. The target initial decoded frame matching the current video frame 3 may be obtained according to a rule self-defined in advance. For example, it may be set that the corresponding initial decoded frame 3 is directly used as a matched target initial decoded frame, or it may be set that the initial decoded frames 2, 3, and 4 are all used as target initial decoded frames.

Step S204B: Obtain a target initial coding unit matching the current coding unit in the target initial decoded frame.

In an embodiment, the current coding unit is a current to-be-encoded coding unit, and the current coding unit is included in the current video frame. The target initial coding unit matching the current coding unit in the target initial decoded frame is obtained. A matching relationship between a to-be-encoded coding unit and an initial coding unit may be similarly self-defined. For example, in an embodiment, the initial coding unit in the target initial decoded frame may be used as the target initial coding unit matching the current coding unit. In another embodiment, a plurality of initial decoding units in the target initial decoded frame may be all used as the target initial coding unit matching the current coding unit. An initial coding unit within a region that corresponds to the current coding unit in the target initial decoded frame may be used as the target initial coding unit matching the current coding unit.

Step S204C: Determine, according to an initial quantization parameter used to encode the target initial coding unit, the current reference quantization parameter corresponding to the current coding unit.

In an embodiment, the current reference quantization parameter is a criterion used to measure the estimated quantization parameter for encoding the current coding unit, and subsequently, the estimated quantization parameter is adjusted according to the current reference quantization parameter. Specifically, the initial quantization parameter used to encode the target initial coding unit is obtained, and the current reference quantization parameter corresponding to the current coding unit is calculated according to the initial quantization parameter. In an embodiment, assuming that an initial quantization parameter of an initial decoded frame used to encode a current video frame cannot be obtained, because quantization parameters of neighboring frames are close to each other, an initial quantization parameter used to encode a neighboring frame may be obtained as a corresponding initial quantization parameter. The current reference quantization parameter corresponding to the current coding unit is then determined. In an embodiment, the initial quantization parameter may be subtracted by a preset value to obtain the current reference quantization parameter corresponding to the current coding unit.

Figure 4:
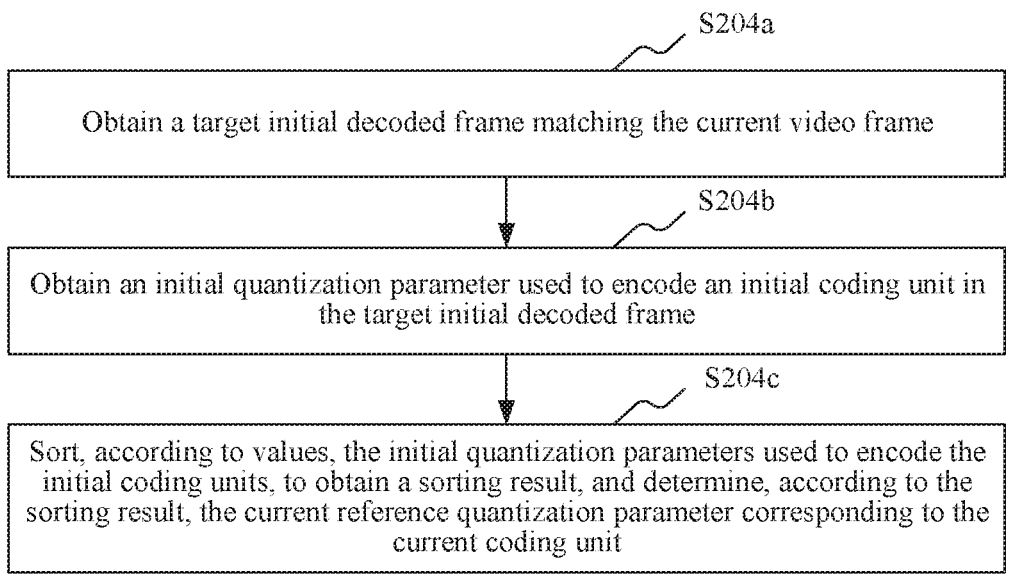
FIG. 4 is a flowchart of a method for determining a current reference quantization parameter corresponding to a current coding unit according to another embodiment.

As shown in FIG. 4, in an embodiment, step S204 in FIG. 2 regarding obtaining the current coding unit in the current video frame, and determining, according to the initial quantization parameter used to encode the initial coding unit, a current reference quantization parameter corresponding to the current coding unit can include the following operations.

Step S204a: Obtain a target initial decoded frame matching the current video frame.

In an embodiment, the initial decoded frame is a video frame obtained by decoding the initial compressed video. The target initial decoded frame is an initial decoded frame matching the current video frame. The current video frame is a current to-be-encoded video frame. Specifically, the server receives the initial compressed video and decodes the initial compressed video, to obtain the initial decoded frame, and uses the initial decoded frame as a to-be-encoded video frame to code the video again. Therefore, the to-be-encoded video frame and the initial decoded frame have a one-to-one correspondence. A matching relationship between the to-be-encoded video frame and the initial decoded frame may be self-defined. In an embodiment, the initial decoded frame used to encode the current video frame may be directly used as the target initial decoded frame. In another embodiment, the current video frame and a plurality of initial decoded frames may be matched. For example, the current video frame, the corresponding initial decoded frame, and a neighboring decoded frame of the initial decoded frame are all used as matched target initial decoded frames. For example, it is assumed that the initial compressed video is decoded to obtain six initial decoded frames, which are respectively 1, 2, 3, 4, 5, and 6. It is assumed that the current to-be-encoded video frame is 3. The target initial decoded frame matching the current video frame 3 may be obtained according to a rule self-defined in advance. For example, it may be set that the corresponding initial decoded frame 3 is directly used as a matched target initial decoded frame, or it may be set that the initial decoded frames 2, 3, and 4 are all used as matched target initial decoded frames.

Step S204b: Obtain an initial quantization parameter used to encode an initial coding unit in the target initial decoded frame.

In an embodiment, each initial decoded frame includes a plurality of initial coding units, and after the matched target initial decoded frame is obtained, the initial quantization parameter used to encode each initial coding unit in the target initial decoded frame needs to be obtained.

Step S204c: Sort, according to an ascending or a descending order, the initial quantization parameters used to encode the initial coding units, to obtain a sorted result, and determine, according to the sorted result, the current reference quantization parameter corresponding to the current coding unit.

In an embodiment, after the initial quantization parameters used to encode the initial coding units are obtained, the initial quantization parameters are sorted according to values of the initial quantization parameters, to obtain the corresponding sorted result. Sorting may be performed in a descending order or in an ascending order. Subsequently, the current reference quantization parameter corresponding to the current coding unit is determined according to the sorted result. In an embodiment, a penultimate smallest initial quantization parameter obtained by sorting may be used as the current reference quantization parameter corresponding to the current coding unit. In another embodiment, the first 10% small initial quantization parameters may be obtained, an average of the 10% initial quantization parameters is calculated, and the calculated average is used as the current reference quantization parameter corresponding to the current coding unit.

In an embodiment, the step of determining, according to the sorted result, the current reference quantization parameter corresponding to the current coding unit includes: using the smallest initial quantization parameter in the sorted result as the current reference quantization parameter corresponding to the current coding unit.

In an embodiment, after the sorted result is obtained, the smallest initial quantization parameter in the sorted result is used as the current reference quantization parameter corresponding to the current coding unit. Because a smaller quantization parameter indicates better fineness, the smallest value in the sorted result is used as the current reference quantization parameter, to subsequently help perform increase adjustment on the estimated quantization parameter according to the current reference quantization parameter, to improve a corresponding compression rate and reduce bandwidth costs.

In an embodiment, the step of obtaining the current coding unit in the current video frame, and determining, according to the initial quantization parameter used to encode the initial coding unit, a current reference quantization parameter corresponding to the current coding unit includes identifying an initial video coding standard corresponding to the initial compressed video, and identifying a current video coding standard corresponding to encoding the current video frame. The method may further include determining a mapping relationship of a quantization parameter according to the initial video coding standard and a quantization parameter according to the current video coding standard, and obtaining the current reference quantization parameter according to the initial quantization parameter used to encode the initial coding unit and the mapping relationship.

In an embodiment, if different video compression standards are used before and after transcoding, to ensure that compression quality corresponding to a quantization parameter is appropriate, an original quantization parameter needs to be mapped into a quantization parameter corresponding to a current coding standard for encoding the current video frame. The mapping relationship is determined according to an initial video coding standard and a current video coding standard. Assuming that the initial video coding standard and the current video coding standard are the same, values are the same before and after mapping, and a corresponding formula may be represented as: f(qp)=qp. If the initial video coding standard and the current video coding standard are different, the corresponding formula may be represented as qp'=$f_i$, where $f_i$ is a linear discrete mapping function in a mapping function F. A selection rule of $f_i$ is represented as follows: $f_i$=F($S_1$,$S_2$), where $S_1$ is a coding standard of the initial compressed video and $S_2$ is the current video coding standard.

Figure 5:
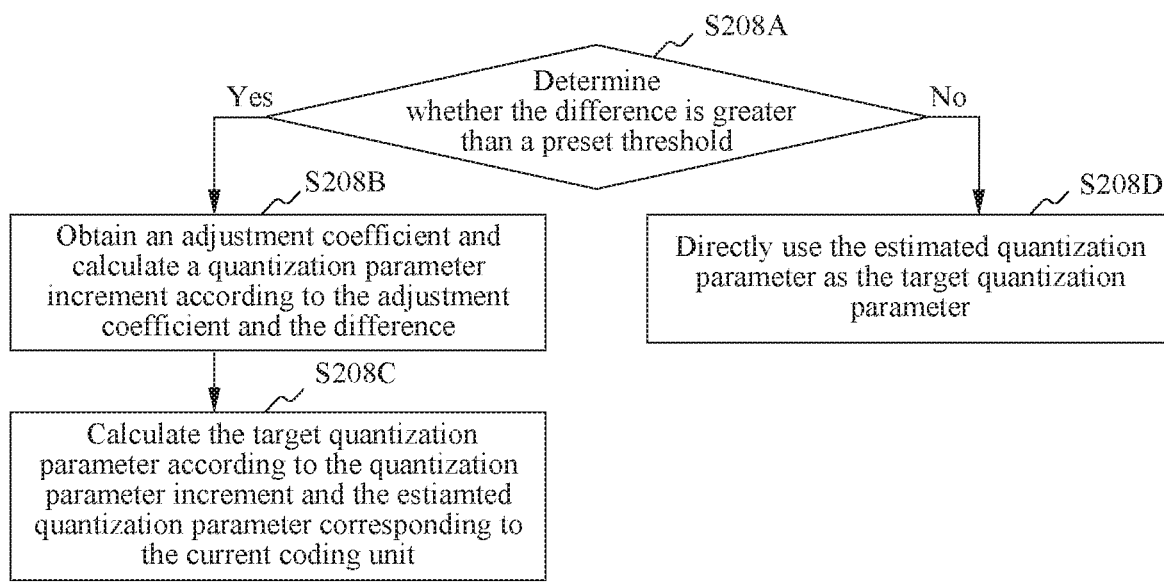
FIG. 5 is a flowchart of a method for determining a target quantization parameter according to an embodiment.

As shown in FIG. 5, in an embodiment, step S208 of determining a difference between the current reference quantization parameter corresponding to the current coding unit and the estimated quantization parameter for encoding the current coding unit, and setting a target quantization parameter to be equal to or greater than the estimated quantization parameter according to the difference may include at least the following operations.

Step S208A: Determine whether the difference is greater than a preset threshold. If yes, the process proceeds to step S208B; otherwise, the process proceeds to step S208D.

In an embodiment, the difference is a difference between the current reference quantization parameter and the estimated quantization parameter. It is determined whether the difference is greater than the preset threshold. If yes, it indicates that increase adjustment needs to be performed on the estimated quantization parameter, an adjustment coefficient is obtained, and a quantization parameter increment is calculated according to the adjustment coefficient and the difference. If not, the estimated quantization parameter does not need to be adjusted, and the estimated quantization parameter is directly used as the target quantization parameter.

Step S208B: Obtain an adjustment coefficient and calculate a quantization parameter increment according to the adjustment coefficient and the difference.

In an embodiment, the adjustment coefficient is a coefficient used to control an adjustment amount, and may be preset. After the difference is calculated, the corresponding quantization parameter increment may be calculated according to the adjustment coefficient and the difference. In an embodiment, the product of the adjustment coefficient and the difference may be directly used as the quantization parameter increment. In another embodiment, the product of the adjustment coefficient and the difference plus a constant may be used as the quantization parameter increment.

Step S208C: Calculate the target quantization parameter according to the quantization parameter increment and the estimated quantization parameter for encoding the current coding unit.

In an embodiment, the quantization parameter increment is an adjustment amount by which the estimated quantization parameter is increased, and an adding operation is performed on the quantization parameter increment and the estimated quantization parameter to obtain the target quantization parameter.

Step S208D: Directly use the estimated quantization parameter as the target quantization parameter.

In an embodiment, if the difference is less than or equal to a preset threshold, the coding quantization parameter is directly used as the target coding quantization parameter, and adjustment is not required.

The current reference quantization parameter is determined according to the quantization parameter used to encode the initial coding unit, so that the current reference quantization parameter reflects the quantization parameter used when the initial coding unit is encoded, and the quantization parameter reflects image fineness. Because a compressed video instead of an original video is obtained for the transcoding process, if the compressed video has undesirable quality, video quality cannot be further improved through applying a smaller quantization parameter during the transcoding process. Instead, applying a smaller quantization parameter during the transcoding process may only degrade the coding efficiency. Therefore, if the difference between the current reference quantization parameter and the estimated quantization parameter is greater than the preset threshold, it indicates that the estimated quantization parameter is unnecessarily small. In this case, video quality cannot be further improved, and a bit rate is wasted. Therefore, the coding quantization parameter may be properly increased, to help improve a coding compression rate, avoid bit rate waste, and reduce corresponding bandwidth costs while ensuring subjective quality.

In at least one embodiment, the target quantization parameter for encoding the current coding unit is calculated by using a piecewise function. When the estimated quantization parameter is greater than the current reference quantization parameter subtracted by the preset threshold, the estimated quantization parameter does not need to be adjusted, that is, the estimated quantization parameter is directly used as the target quantization parameter. When the estimated quantization parameter is less than or equal to the current reference quantization parameter subtracted by the preset threshold, a corresponding quantization parameter increment is calculated according to the adjustment coefficient and the difference between the current reference quantization parameter and the estimated quantization parameter. Then, the target coding quantization parameter is equal to a sum of the estimated quantization parameter and the quantization parameter increment. A specific formula is represented as follows:

$$qp' = \begin{cases} qp + \alpha(qp_0 - qp), & qp < qp_0 - \beta \\ qp, & qp \geq qp_0 - \beta \end{cases}.$$

qp' represents the target quantization parameter, qp represents the estimated quantization parameter, $qp_0$ represents the current reference quantization parameter, α represents the adjustment coefficient, and β represents the preset threshold.

In an embodiment, the video transcoding method further includes obtaining a target initial decoded frame matching the current video frame, and determining, according to the initial quantization parameter used to encode the initial coding unit in the target initial decoded frame, an average reference quantization parameter corresponding to encoding an initial video frame that corresponds to the current video frame.

Specifically, after the target initial decoded frame matching the current video frame is obtained, the average reference quantization parameter of quantization parameters used to encode the current video frame is calculated according to the initial quantization parameter used to encode the initial coding unit in the target initial decoded frame. In an embodiment, the initial quantization parameters used to encode the initial coding units may be directly averaged, to calculate the average reference quantization parameter. In another embodiment, the initial quantization parameters may be sorted (e.g., according to an ascending or a descending order), and a value corresponding to an initial quantization parameter in the middle location is used as the average reference quantization parameter. In an embodiment, if video coding standards used before and after coding are different, the calculated average reference quantization parameter further needs to be mapped to calculate a final average reference quantization parameter.

In some embodiments, the step of obtaining the adjustment coefficient includes calculating a difference between the average reference quantization parameter and the current reference quantization parameter, and calculating the adjustment coefficient according to the difference, where the adjustment coefficient and the difference are negatively correlated.

In an embodiment, the adjustment coefficient may be determined by calculating according to a first difference between the average reference quantization parameter and the current reference quantization parameter, and the calculated difference between the average reference quantization parameter and the current reference quantization parameter is referred to as "a second difference". To avoid excessive adjustment, it is set that the adjustment coefficient and the target difference are negatively correlated. That is, when the second difference is larger, the calculated adjustment coefficient is smaller, and when the second difference is smaller, the calculated adjustment coefficient is larger. In an embodiment, the following formula may be used for calculating: $\alpha = k/(qp_{ave} - qp_0)$, where $\alpha$ represents the adjustment coefficient, k represents a constant, $qp_{ave}$ represents the average reference quantization parameter, and $qp_0$ represents the current reference quantization parameter. A product of the adjustment coefficient and the target difference is used as the quantization parameter increment, to avoid excessive adjustment and impact on image quality.

In an embodiment, the step of determining, according to the initial quantization parameter used to encode the initial coding unit in the target initial decoded frame, an average reference quantization parameter may include obtaining initial quantization parameters used to encode initial coding units in the target initial decoded frame, and performing averaging calculation according to the initial quantization parameters used to encode the initial coding units, to obtain an average value, and using the average value as the average reference quantization parameter for the current coding unit in the current video frame.

In some embodiments, after the target initial decoded frame matching the current video frame is obtained, the initial quantization parameters used to encode the target initial coding units in the target initial decoded frame are obtained, an average operation is performed on the initial quantization parameters of quantization parameters used to encode the initial coding units, to obtain the average value, and the average value is directly used as the average reference quantization parameter for the current coding unit in the current video frame.

Figure 6:
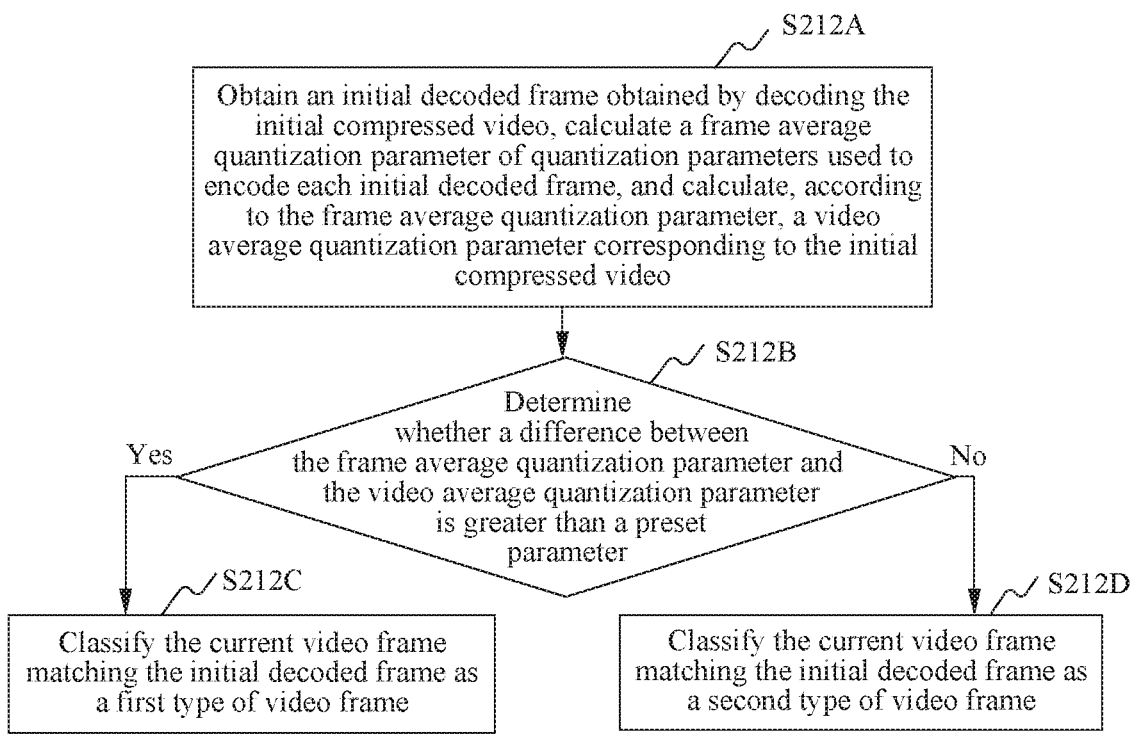
FIG. 6 is a flowchart of a method for classifying video frames according to frame average quantization parameters corresponding to the video frames according to an embodiment.

As shown in FIG. 6, in an embodiment, the video transcoding method further includes a step of classifying current video frames according to frame average quantization parameters of quantization parameters used to encode the current video frames. The step includes at least the following operations.

Step S212A: Obtain an initial decoded frame that is obtained by decoding the initial compressed video, calculate a frame average quantization parameter of quantization parameters used to encode each initial decoded frame, and calculate, according to the frame average quantization parameters of each of the initial decoded frames, a video average quantization parameter corresponding to the initial compressed video.

In an embodiment, the initial decoded frame is a video frame obtained by decoding the initial compressed video. The frame average quantization parameter is the average quantization parameter of quantization parameters used to encode the initial decoded frame. In some embodiments, the initial quantization parameters used to encode the initial coding units in the initial decoded frame may be obtained, an average operation is performed according to the initial quantization parameters used to encode the initial coding units to obtain an average value, and the average value may be used as the frame average quantization parameter. Similarly, after the frame average quantization parameter of quantization parameters used to encode each initial decoded frame is calculated, the video average quantization parameter of quantization parameters used to encode the initial compressed video may be calculated according to the frame average quantization parameters corresponding to the initial decoded frames in the initial compressed video.

Step S212B: Determine whether a difference between the frame average quantization parameter and the video average quantization parameter is greater than a preset parameter. If yes, the process proceeds to step S212C; otherwise, the process proceeds to step S212D.

In an embodiment, the difference between the frame average quantization parameter and the video average quantization parameter is determined. If the difference is greater than the preset parameter (for example, 5), the video frame is classified as a first type of video frame; otherwise, the video frame is classified as a second type of video frame.

Step S212C: Classify the current video frame matching the initial decoded frame as a first type of video frame, for which a first adjustment coefficient will be applied in some embodiments.

Step S212D: Classify the current video frame matching the initial decoded frame as a second type of video frame, for which a second adjustment coefficient that is different from the first adjustment coefficient will be applied in some embodiments.

In an embodiment, the initial decoded frames are classified into two types according to the difference between the video average quantization parameter and the frame average quantization parameter. Because the initial decoded frame obtained by decoding is used as the to-be-encoded current video frame, the initial decoded frame and the current video frame are in a one-to-one correspondence. When the difference between the frame average quantization parameter and the video average quantization parameter is greater than the preset parameter, the current video frame corresponding to the initial decoded frame is classified as a first type of video frame; otherwise, the current video frame corresponding to the initial decoded frame is classified as a second type of video frame. To-be-encoded video frames are classified into two types, to subsequently help adjust the estimated quantization parameters using different approaches or different parameters for different types of video frames. In some embodiments, if the difference between the frame average quantization parameter and the video average quantization parameter is large, it indicates that a quantization parameter used to encode the initial coding unit in the video frame is large and corresponding image quality is poor. Otherwise, image quality may still be acceptable. Corresponding to-be-encoded video frames are classified into two types according to the frame average quantization parameter, to subsequently help adjust the adjustment coefficient differently.

Step S208B of obtaining an adjustment coefficient and calculating a quantization parameter increment according to the adjustment coefficient and a difference between the current reference quantization parameter and the estimated quantization parameter may include, when the current video frame in which the current coding unit is located is classified as the first type of video frame, obtaining a first adjustment coefficient, and calculating the quantization parameter increment according to the first adjustment coefficient and the difference between the current reference quantization parameter and the estimated quantization parameter. In some embodiments, the method may further include, when the current video frame in which the current coding unit is located is the second type of video frame, obtaining a second adjustment coefficient, and calculating the quantization parameter increment according to the second adjustment coefficient and the difference between the current reference quantization parameter and the estimated quantization parameter.

In an embodiment, to further improve compression efficiency while ensuring subjective quality, different adjustment coefficients are set for different types of video frames, and for video frames with large frame average quantization parameters, the adjustment coefficient may be set to a larger value accordingly. As the frame average quantization parameter used to encode the initial decoded frame is large, it indicates that the original frame image quality is already very poor. Therefore, coding quality cannot be improved through applying a smaller quantization parameter, and the adjustment coefficient can be increased to further improve compression efficiency. On the contrary, for video frames with small frame average quantization parameters, the adjustment coefficient may be set to a smaller value accordingly.

Figure 7:
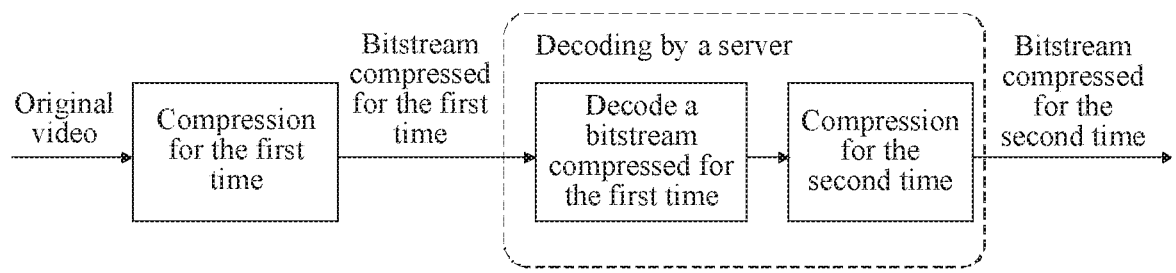
FIG. 7 is a functional block diagram of video transcoding according to an embodiment.

FIG. 7 is a functional block diagram of video transcoding according to an embodiment. For ease of description, a video that is not compressed by the terminal is referred to as an "original video", a bitstream that is compressed by the terminal is referred to as a "bitstream compressed for the first time", that is, a to-be-transcoded bitstream, and a compression process of the terminal is referred to as "compression for the first time". The terminal uploads the bitstream compressed for the first time to a server. A transcoding process of the server is divided into "decoding of the bitstream compressed for the first time" and "compression for the second time". A bitstream obtained by the server after transcoding is referred to as a "bitstream compressed for the second time", and compression by the server is referred to as "compression for the second time". This embodiment mainly focuses on transcoding by the server. In some embodiments, after receiving the bitstream compressed for the first time, the server first decodes the bitstream compressed for the first time, obtains the initial quantization parameter of each coding unit in the video frame compressed for the first time, calculates, according to the initial quantization parameter, a reference value of a second-time compression quantization parameter for encoding each coding unit, determines an estimated quantization parameter for encoding a coding units for the second-time, performs increase adjustment on the estimated quantization parameter according to the reference value of the second-time compression quantization parameter, to obtain a second-time compression target quantization parameter, and encodes the coding unit according to the second-time compression target quantization parameter, to obtain a bitstream compressed for the second time.

Figure 8:
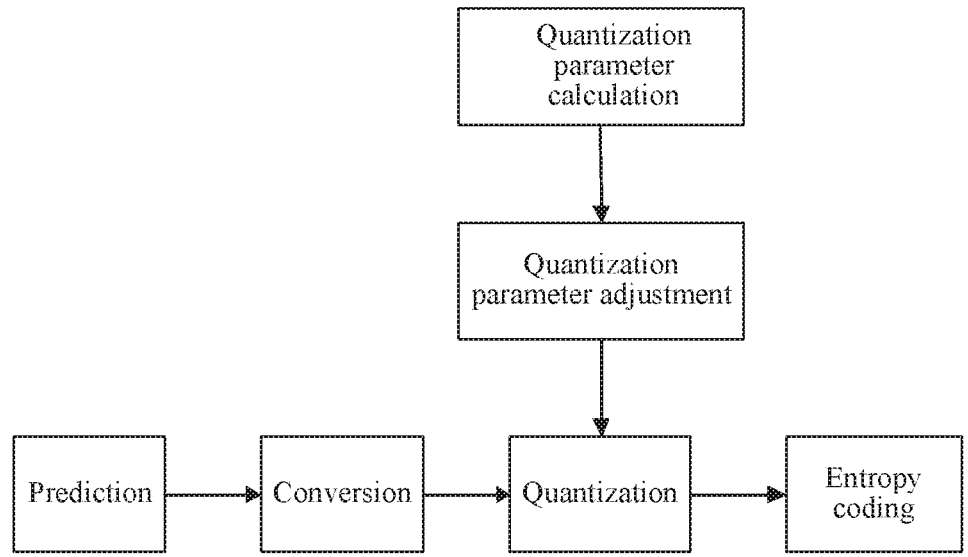
FIG. 8 is a functional block diagram of encoding a coding unit according to an embodiment.

FIG. 8 is a functional block diagram of encoding a coding unit according to an embodiment. First, prediction is performed to reduce space redundancy and temporal redundancy of a video image by intra prediction and inter prediction. Next, conversion is performed, and conversion from time domain to frequency domain eliminates correlation between neighboring data, that is, eliminates space redundancy. Subsequently, quantization is performed without using a calculated estimated quantization parameter directly. Instead, the calculated estimated quantization parameter is adjusted, to help improve compression efficiency and avoid bandwidth waste. Finally, the coding unit is encoded by using entropy coding.

Figure 9:
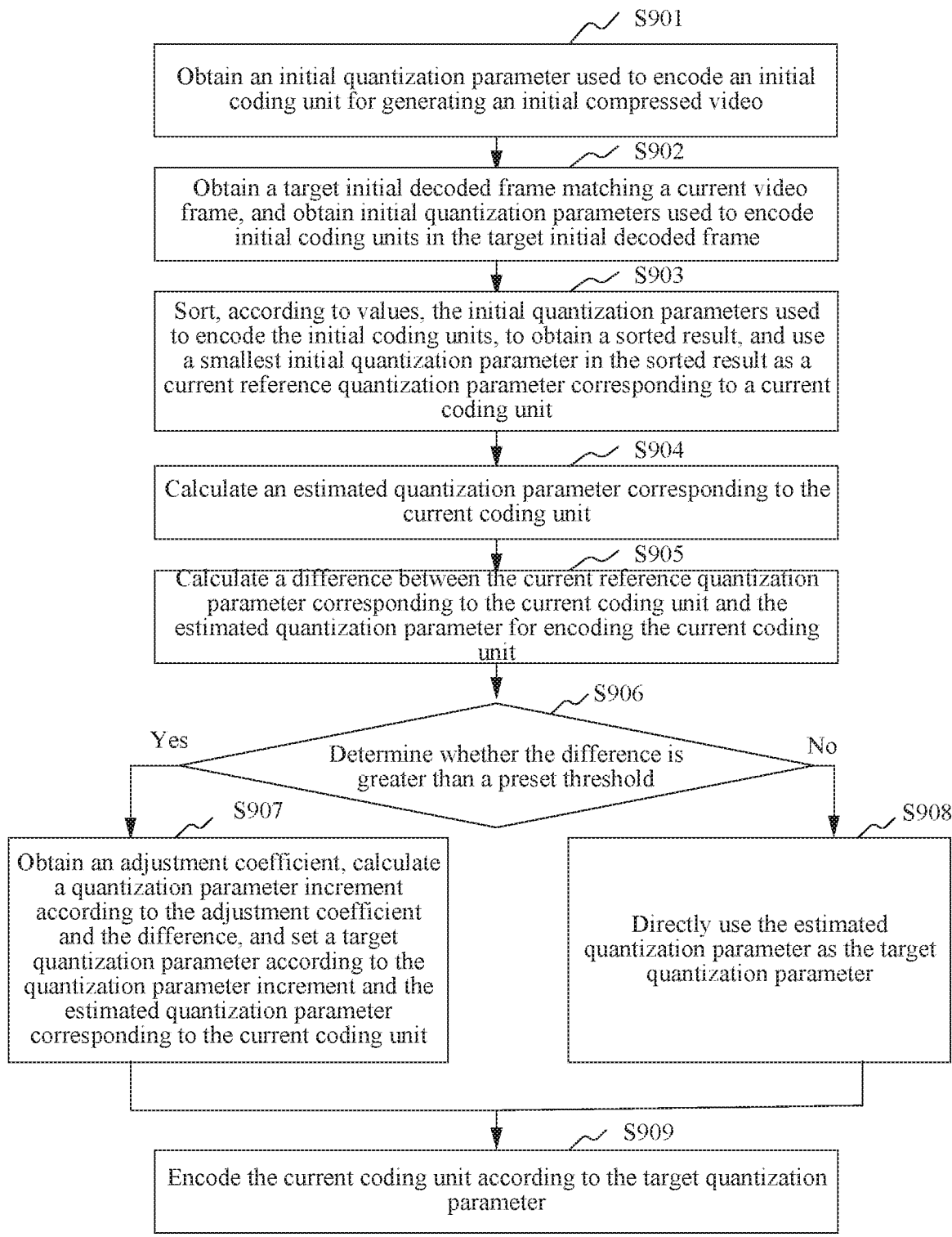
FIG. 9 is a flowchart of a video transcoding method according to another embodiment.

FIG. 9 is a flowchart of a video transcoding method according to another embodiment. As shown in FIG. 9, in an embodiment, a video transcoding method is provided. The method may include at least the following operations.

Step S901: Obtain an initial quantization parameter used to encode an initial coding unit for generating an initial compressed video.

Step S902: Obtain a target initial decoded frame matching a current video frame, and obtain initial quantization parameters used to encode initial coding units in the target initial decoded frame.

Step S903: Sort, according to values (e.g., in an ascending or descending order), the initial quantization parameters used to encode the initial coding units, to obtain a sorted result, and use a smallest initial quantization parameter in the sorted result as a current reference quantization parameter corresponding to a current coding unit.

Step S904: Calculate an estimated quantization parameter for encoding the current coding unit.

Step S905: Calculate a difference between the current reference quantization parameter corresponding to the current coding unit and the estimated quantization parameter for encoding the current coding unit.

Step S906: Determine whether the difference is greater than a preset threshold. If yes, the process proceeds to step S907; otherwise, the process proceeds to step S908.

Step S907: Obtain an adjustment coefficient, calculate a quantization parameter increment according to the adjustment coefficient and the difference, and set a target quantization parameter according to the quantization parameter increment and the estimated quantization parameter for encoding the current coding unit.

Step S908: Directly use the estimated quantization parameter as the target quantization parameter.

Step S909: Encode the current coding unit according to the target quantization parameter.

It should be understood that although the steps in the flowchart are arranged according to a particular order according to indication of the depicted arrows, the steps are not necessarily sequentially performed according to a sequence indicated by the arrows. Unless clearly described in this specification, a sequence of performing the steps is not strictly limited to the example shown in the drawings, and the steps may be performed in a different order. Besides, at least some steps may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 10:
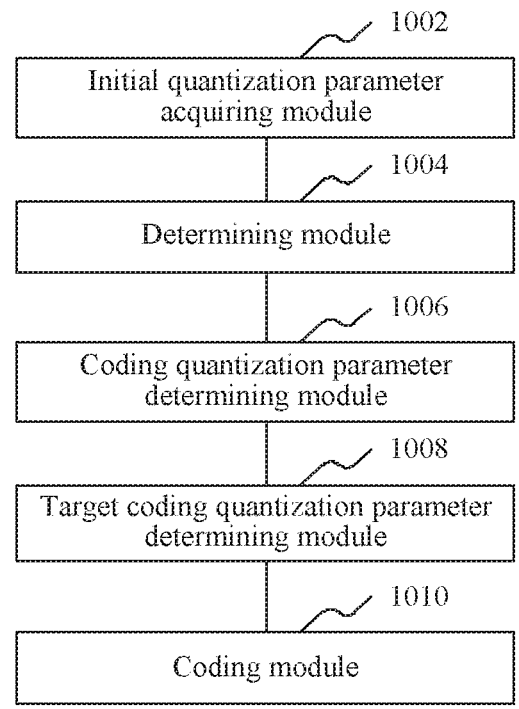
FIG. 10 is a structural block diagram of a video transcoding apparatus according to an embodiment.

FIG. 10 is a structural block diagram of a video transcoding apparatus according to an embodiment. As shown in FIG. 10, a video transcoding apparatus is provided. In some embodiments, the apparatus includes an initial quantization parameter acquiring module 1002, a determining module 1004, a coding quantization parameter determining module 1006, a target coding quantization parameter determining module 1008, and a coding module 1010.

The initial quantization parameter acquiring module 1002 is configured to obtain an initial quantization parameter used to encode an initial coding unit for generating an initial compressed video. The determining module 1004 is configured to obtain the current coding unit in the current video frame, and determine, according to the initial quantization parameter used to encode the initial coding unit, a current reference quantization parameter corresponding to the current coding unit. The coding quantization parameter determining module 1006 is configured to determine an estimated quantization parameter for encoding the current coding unit. The target coding quantization parameter determining module 1008 is configured to determine a difference between the current reference quantization parameter corresponding to the current coding unit and the estimated quantization parameter for encoding the current coding unit, and set a target quantization parameter to be equal to or greater than the estimated quantization parameter according to the difference. The coding module 1010 is configured to encode the current coding unit according to the target quantization parameter.

In an embodiment, the determining module 1004 is further configured to obtain a target initial decoded frame matching the current video frame, obtain a target initial coding unit matching the current coding unit in the target initial decoded frame, and determine, according to an initial quantization parameter used to encode the target initial coding unit, the current reference quantization parameter corresponding to the current coding unit.

Figure 11:
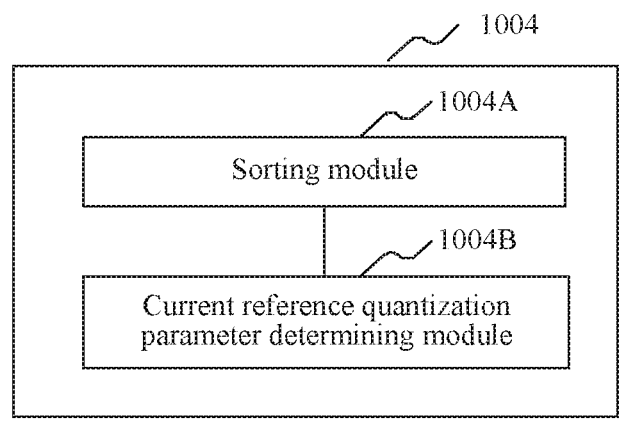
FIG. 11 is a structural block diagram of a determining module according to an embodiment.

FIG. 11 is a structural block diagram of a determining module according to an embodiment. As shown in FIG. 11, in an embodiment, the determining module 1004 includes a sorting module 1004A and a current reference quantization parameter determining module 1004B.

The sorting module 1004A is configured to obtain a target initial decoded frame matching a current video frame, obtain initial quantization parameters used to encode initial coding units in the target initial decoded frame, and sort, according to values (e.g., in an ascending or descending order), the initial quantization parameters used to encode the initial coding units, to obtain a sorted result. The current reference quantization parameter determining module 1004B is configured to determine, according to the sorted result, the current reference quantization parameter corresponding to the current coding unit.

In an embodiment, the current reference quantization parameter determining module is further configured to use the smallest initial quantization parameter in the sorted result as the current reference quantization parameter corresponding to the current coding unit.

In an embodiment, the determining module 1004 is further configured to identify an initial video coding standard corresponding to the initial compressed video, and identify a current video coding standard corresponding to encoding the current video frame. The determining module 1004 can be configured to determine a mapping relationship of a quantization parameter according to the initial video coding standard and a quantization parameter according to the current video coding standard, and obtain the current reference quantization parameter according to the initial quantization parameter used to encode the initial coding unit and the mapping relationship.

In an embodiment, the target coding quantization parameter determining module 1008 is further configured to, when the difference is greater than a preset threshold, obtain an adjustment coefficient, and calculate a quantization parameter increment according to the adjustment coefficient and the difference, and calculate the target quantization parameter according to the quantization parameter increment and the estimated quantization parameter for encoding the current coding unit.

Figure 12:
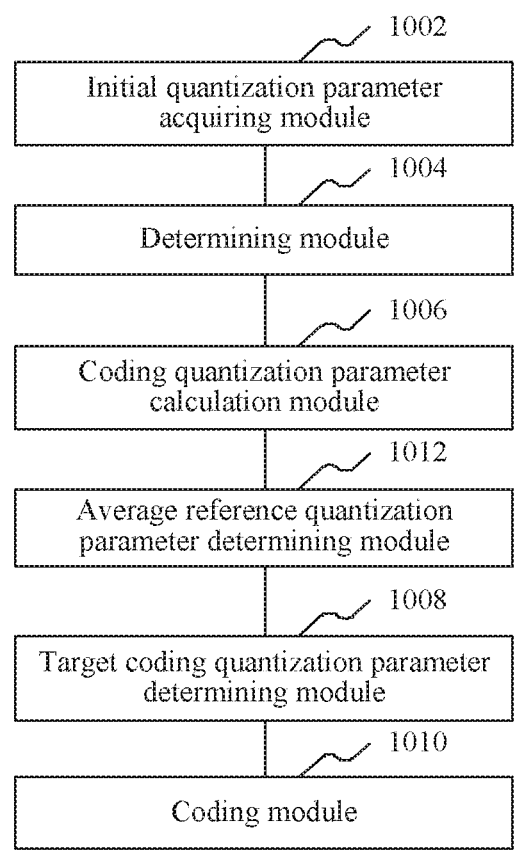
FIG. 12 is a functional block diagram of a video transcoding apparatus according to another embodiment.

FIG. 12 is a functional block diagram of a video transcoding apparatus according to another embodiment. As shown in FIG. 12, in an embodiment in comparison with the example shown in FIG. 10, the video transcoding apparatus further includes an average reference quantization parameter determining module 1012. The average reference quantization parameter determining module 1012 is configured to obtain a target initial decoded frame matching the current video frame, and determine, according to the initial quantization parameter used to encode the initial coding unit in the target initial decoded frame, an average reference quantization parameter of quantization parameters used to encode to the current coding unit.

The target coding quantization parameter determining module 1008 is further configured to calculate a difference between the average reference quantization parameter and the current reference quantization parameter; and calculate the adjustment coefficient according to the difference, where the adjustment coefficient and the difference are positively correlated.

In an embodiment, the average reference quantization parameter determining module 1012 is further configured to obtain initial quantization parameters used to encode initial coding units in the target initial decoded frame, and perform an averaging calculation according to the initial quantization parameters used to encode the initial coding units, to obtain an average quantization parameter. The average reference quantization parameter determining module 1012 is further configured to use the average quantization parameter as the average reference quantization parameter of quantization parameters used to encode the current coding unit in the current video frame.

Figure 13:
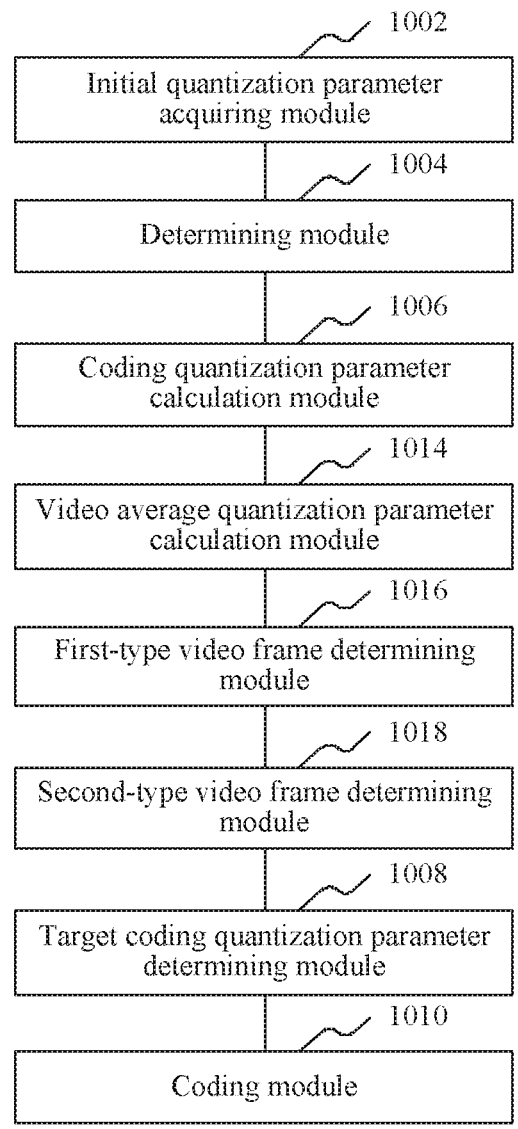
FIG. 13 is a functional block diagram of a video transcoding apparatus according to still another embodiment.

FIG. 13 is a functional block diagram of a video transcoding apparatus according to still another embodiment. As shown in FIG. 13, in an embodiment in comparison with the example shown in FIG. 10, the video transcoding apparatus further includes a video average quantization parameter calculation module 1014, a first-type video frame determining module 1016, and a second-type video frame determining module 1018.

The video average quantization parameter calculation module 1014 is configured to obtain an initial decoded frame obtained by decoding the initial compressed video, calculate a frame average quantization parameter of quantization parameters used to encode each initial decoded frame, and calculate, according to the frame average quantization parameters of initial decoded frames, a video average quantization parameter corresponding to the initial compressed video. The first-type video frame determining module 1016 is configured to, when a difference between the video average quantization parameter and the frame average quantization parameter is greater than a preset parameter, classify a current video frame matching the initial decoded frame as a first type of video frame. The second-type video frame determining module 1018 is configured to, when a difference between the video average quantization parameter and the frame average quantization parameter is less than or equal to a preset parameter, classify a current video frame matching the initial decoded frame as a second type of video frame. The target coding quantization parameter determining module 1008 is further configured to, when the current video frame in which the current coding unit is located is classified as the first type of video frame, obtain a first adjustment coefficient, and calculate the quantization parameter increment according to the first adjustment coefficient and the difference between the estimated quantization parameter and the current reference quantization parameter; and when the current video frame in which the current coding unit is located is the second type of video frame, obtain a second adjustment coefficient, and calculate the quantization parameter increment according to the second adjustment coefficient and the difference between the estimated quantization parameter and the current reference quantization parameter.

Figure 14:
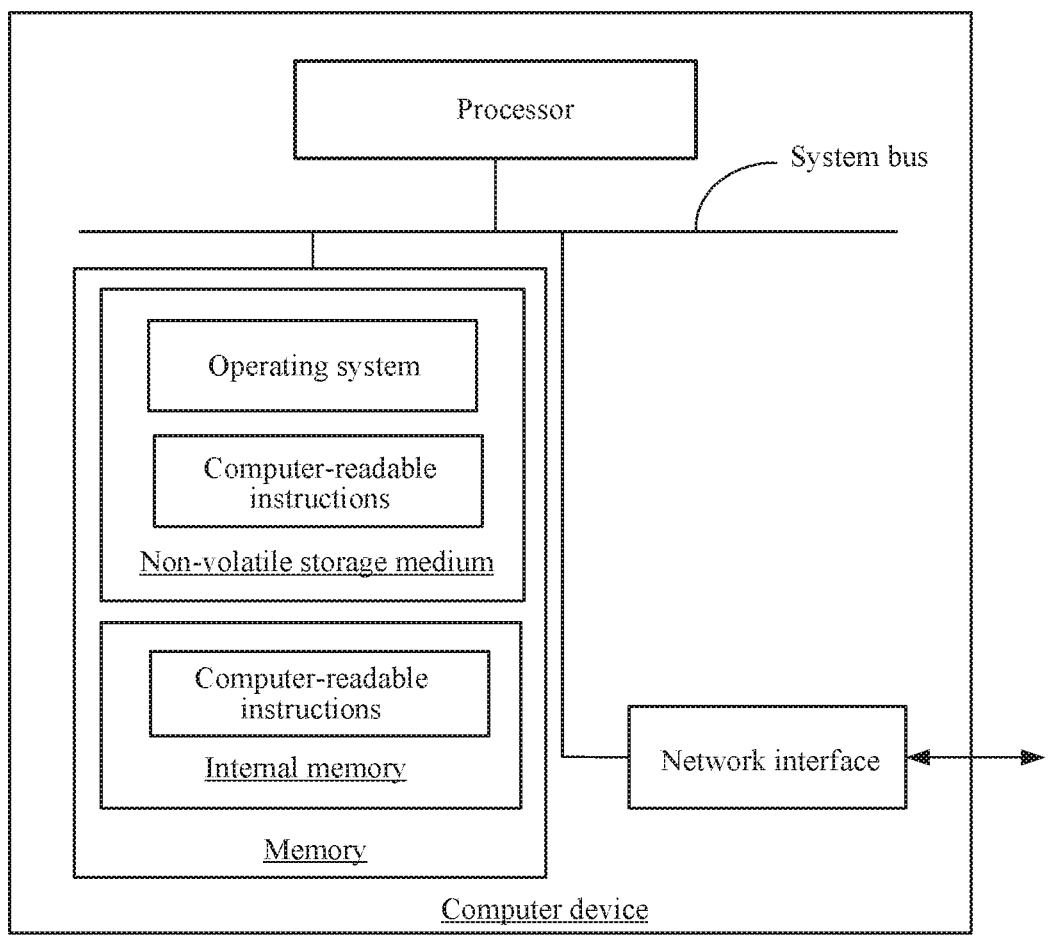
FIG. 14 is a block diagram of a computer device according to an embodiment.

FIG. 14 is a block diagram of a computer device according to an embodiment. The computer device may be the server 120 in FIG. 1. As shown in FIG. 14, the computer device includes a processor, a memory, and a network interface connected by using a system bus. The memory includes a non-volatile storage medium and an internal memory. The non-volatile storage medium of the computer device stores an operating system, and may further store computer-readable instructions. When the computer-readable instruction is executed by the processor, the processor may be caused to perform the video transcoding method. The internal memory may also store computer-readable instructions, and when the computer-readable instructions are executed by the processor, the processor may be caused to perform the video transcoding method.

A person skilled in the art may understand that the structure shown in FIG. 14 is only a block diagram of a partial structure related to some embodiments of this application, and does not limit the computer device to which the embodiments of this application is applied. Specifically, the computer device may include more or less components than those shown in the figure, or some components may be combined, or different component deployment may be used.

In an embodiment, the video transcoding apparatus provided in this application may be implemented in a form of computer-readable instructions, and the computer-readable instructions may be executed by the computer device shown in FIG. 14. The memory of the computer device may store program modules forming the video transcoding apparatus, for example, the initial quantization parameter acquiring module 1002, the determining module 1004, the coding quantization parameter calculation module 1006, the target coding quantization parameter determining module 1008, and the coding module 1010 shown in FIG. 10. The computer-readable instructions can be used to implement the program modules that cause the processor to perform the steps in the video transcoding method in the embodiments of this application described in this specification. For example, in the computer device shown in FIG. 14, the initial quantization parameter acquiring module 1002 of the video transcoding apparatus shown in FIG. 10 may be used to obtain the initial quantization parameter used to encode the initial coding unit for generating the initial compressed video. The determining module 1004 is used to obtain the current coding unit in the current video frame, and determine, according to the initial quantization parameter used to encode the initial coding unit, the current reference quantization parameter corresponding to the current coding unit. The coding quantization parameter calculation module 1006 is used to calculate the estimated quantization parameter for encoding the current coding unit. The target coding quantization parameter determining module 1008 is used to calculate the difference between the current reference quantization parameter corresponding to the current coding unit and the estimated quantization parameter for encoding the current coding unit, and set the target quantization parameter to be equal to or greater than the estimated quantization parameter according to the difference. The coding module 1010 is used to encode the current coding unit according to the target quantization parameter.

A computer device, including a memory and one or more processors, where the memory stores computer-readable instructions, and when the computer-readable instructions being executed by the one or more processors, the one or more processors are caused to perform at least obtaining an initial quantization parameter used to encode an initial coding unit for generating an initial compressed video; determining, according to the initial quantization parameter used to encode the initial coding unit, a current reference quantization parameter corresponding to a current coding unit in a current video frame; determining an estimated quantization parameter for encoding the current coding unit; determining a difference between the estimated quantization parameter for encoding the current coding unit and the current reference quantization parameter corresponding to the current coding unit, and setting the target quantization parameter to be equal to or greater than the estimated quantization parameter according to the difference; and encoding the current coding unit according to the target quantization parameter.

In an embodiment, the step of obtaining the current coding unit in the current video frame, and determining, according to the initial quantization parameter used to encode the initial coding unit, a current reference quantization parameter corresponding to the current coding unit includes obtaining a target initial decoded frame matching the current video frame, obtaining a target initial coding unit matching the current coding unit in the target initial decoded frame, and determining, according to an initial quantization parameter used to encode the target initial coding unit, the current reference quantization parameter corresponding to the current coding unit.

In an embodiment, the step of obtaining the current coding unit in the current video frame, and determining, according to the initial quantization parameter used to encode the initial coding unit, a current reference quantization parameter corresponding to the current coding unit includes obtaining a target initial decoded frame matching the current video frame, obtaining initial quantization parameters used to encode initial coding units in the target initial decoded frame, and sorting the initial quantization parameters used to encode the initial coding units according to values (e.g., an ascending or a descending order) to obtain a sorted result, and determining, according to the sorted result, the current reference quantization parameter corresponding to the current coding unit.

In an embodiment, the step of determining, according to the sorted result, the current reference quantization parameter corresponding to the current coding unit includes using a smallest (or minimum) initial quantization parameter in the sorted result as the current reference quantization parameter corresponding to the current coding unit.

In an embodiment, the step of obtaining the current coding unit in the current video frame, and determining, according to the initial quantization parameter used to encode the initial coding unit, a current reference quantization parameter corresponding to the current coding unit includes identifying an initial video coding standard corresponding to the initial compressed video, and identifying a current video coding standard corresponding to the current video frame; determining a mapping relationship of a quantization parameter according to the initial video coding standard and a quantization parameter according to the current video coding standard; and obtaining the current reference quantization parameter according to the initial quantization parameter used to encode the initial coding unit and the mapping relationship.

In an embodiment, the step of determining a difference between the current reference quantization parameter corresponding to the current coding unit and the estimated quantization parameter for encoding the current coding unit, and setting a target quantization parameter includes, when the difference is greater than a preset threshold, obtaining an adjustment coefficient, and calculating a quantization parameter increment according to the adjustment coefficient and the difference; and calculating the target quantization parameter according to the quantization parameter increment and the estimated quantization parameter for encoding the current coding unit.

In an embodiment, when the computer-readable instructions being executed by the processors, the processors are further caused to perform at least obtaining a target initial decoded frame matching the current video frame, and determining, according to the initial quantization parameter used to encode the initial coding unit in the target initial decoded frame, an average reference quantization parameter of quantization parameters used to encode the current coding unit. The step of obtaining an adjustment coefficient may include calculating a difference between the average reference quantization parameter and the current reference quantization parameter; and calculating the adjustment coefficient according to the difference, where the adjustment coefficient and the difference are positively correlated.

In an embodiment, the step of determining, according to the initial quantization parameter used to encode the initial coding unit in the target initial decoded frame, an average reference quantization parameter corresponding to the current coding unit includes obtaining initial quantization parameters used to encode initial coding units in the target initial decoded frame, and performing averaging calculation according to the initial quantization parameters used to encode the initial coding units, to obtain an average quantization parameter. In some embodiments, the average quantization parameter is used as the average reference quantization parameter corresponding to the current coding unit in the current video frame.

In an embodiment, when the computer-readable instructions being executed by the processors, the processors are further caused to perform at least obtaining an initial decoded frame obtained by decoding the initial compressed video, calculating a frame average quantization parameter of quantization parameters used to encode each initial decoded frame, and calculating, according to the frame average quantization parameter, a video average quantization parameter corresponding to the initial compressed video. In some embodiments, when a difference between the video average quantization parameter and the frame average quantization parameter is greater than a preset parameter, a current video frame matching the initial decoded frame can be classified as a first type of video frame; and when a difference between the video average quantization parameter and the frame average quantization parameter is less than or equal to a preset parameter, a current video frame matching the initial decoded frame can be classified as a second type of video frame. The step of obtaining an adjustment coefficient, and calculating a quantization parameter increment according to the adjustment coefficient and the difference may include, when the current video frame in which the current coding unit is located is classified as the first type of video frame, obtaining a first adjustment coefficient, and calculating the quantization parameter increment according to the first adjustment coefficient and the difference between the current reference quantization parameter and the estimated quantization parameter; and when the current video frame in which the current coding unit is located is classified as the second type of video frame, obtaining a second adjustment coefficient, and calculating the quantization parameter increment according to the second adjustment coefficient and the difference between the current reference quantization parameter and the estimated quantization parameter.

In an embodiment, one or more computer-readable non-volatile storage mediums (or one or more non-transitory computer-readable storage mediums) storing computer-readable instructions is provided, where when the computer-readable instructions being executed by one or more processors, the one or more processors are caused to perform at least obtaining an initial quantization parameter used to encode an initial coding unit for generating an initial compressed video; determining, according to the initial quantization parameter used to encode the initial coding unit, a current reference quantization parameter corresponding to the current coding unit in a current video frame; determining an estimated quantization parameter for encoding the current coding unit; determining a difference between the estimated quantization parameter for encoding the current coding unit and the current reference quantization parameter corresponding to the current coding unit, and setting the target quantization parameter to be equal to or greater than the estimated quantization parameter according to the difference; and encoding the current coding unit according to the target quantization parameter.

In an embodiment, the step of obtaining the current coding unit in the current video frame, and determining, according to the initial quantization parameter used to encode the initial coding unit, a current reference quantization parameter corresponding to the current coding unit includes obtaining a target initial decoded frame matching the current video frame; obtaining a target initial coding unit matching the current coding unit in the target initial decoded frame; and determining, according to an initial quantization parameter used to encode the target initial coding unit, the current reference quantization parameter corresponding to the current coding unit.

In an embodiment, the step of obtaining the current coding unit in the current video frame, and determining, according to the initial quantization parameter used to encode the initial coding unit, a current reference quantization parameter corresponding to the current coding unit includes obtaining a target initial decoded frame matching the current video frame; obtaining initial quantization parameters used to encode initial coding units in the target initial decoded frame; and sorting the initial quantization parameters used to encode the initial coding units according to values (e.g., an ascending or a descending order) to obtain a sorted result, and determining, according to the sorted result, the current reference quantization parameter corresponding to the current coding unit.

In an embodiment, the step of determining, according to the sorted result, the current reference quantization parameter corresponding to the current coding unit includes: using a smallest initial quantization parameter in the sorted result as the current reference quantization parameter corresponding to the current coding unit.

In an embodiment, the step of obtaining the current coding unit in the current video frame, and determining, according to the initial quantization parameter used to encode to the initial coding unit, a current reference quantization parameter corresponding to the current coding unit includes identifying an initial video coding standard corresponding to the initial compressed video, and identifying a current video coding standard corresponding to the current video frame; determining a mapping relationship of a quantization parameter according to the initial video coding standard and a quantization parameter according to the current video coding standard; and obtaining the current reference quantization parameter according to the initial quantization parameter used to encode the initial coding unit and the mapping relationship.

In an embodiment, the step of determining a difference between the current reference quantization parameter corresponding to the current coding unit and the estimated quantization parameter for encoding the current coding unit, and setting the target coding quantization parameter includes, when the difference is greater than a preset threshold, obtaining an adjustment coefficient, and calculating a quantization parameter increment according to the adjustment coefficient and the difference; and calculating the target quantization parameter according to the quantization parameter increment and the estimated quantization parameter for encoding the current coding unit.

In an embodiment, when the computer-readable instructions being executed by the processors, the processors are further caused to perform at least obtaining a target initial decoded frame matching the current video frame; determining, according to the initial quantization parameter used to encode the initial coding unit in the target initial decoded frame, an average reference quantization parameter corresponding to the current coding unit; and the step of obtaining an adjustment coefficient includes: calculating a difference between the average reference quantization parameter and the current reference quantization parameter; and calculating the adjustment coefficient according to the difference, where the adjustment coefficient and the difference are positively correlated.

In an embodiment, the step of determining, according to the initial quantization parameter used to encode the initial coding unit in the target initial decoded frame, an average reference quantization parameter corresponding to the current coding unit includes obtaining initial quantization parameters used to encode initial coding units in the target initial decoded frame, and performing averaging calculation according to the initial quantization parameters used to encode the initial coding units, to obtain an average quantization parameter; and using the average quantization parameter as the average reference quantization parameter corresponding to the current coding unit in the current video frame.

In an embodiment, when the computer-readable instructions being executed by the processors, the processors are further caused to perform obtaining an initial decoded frame obtained by decoding the initial compressed video, calculating a frame average quantization parameter of quantization parameters used to encode each initial decoded frame, and calculating, according to the frame average quantization parameter, a video average quantization parameter corresponding to the initial compressed video; when a difference between the video average quantization parameter and the frame average quantization parameter is greater than a preset parameter, classifying a current video frame matching the initial decoded frame as a first type of video frame; and when a difference between the video average quantization parameter and the frame average quantization parameter is less than or equal to a preset parameter, classifying a current video frame matching the initial decoded frame as a second type of video frame. The step of obtaining an adjustment coefficient, and calculating a quantization parameter increment according to the adjustment coefficient and the difference includes, when the current video frame in which the current coding unit is located is the first type of video frame, obtaining a first adjustment coefficient, and calculating the quantization parameter increment according to the first adjustment coefficient and the difference between the current reference quantization parameter and the estimated quantization parameter; and when the current video frame in which the current coding unit is located is the second type of video frame, obtaining a second adjustment coefficient, and calculating the quantization parameter increment according to the second adjustment coefficient and the difference between the current reference quantization parameter and the estimated quantization parameter.

A person of ordinary skill in the art may understand that some or all procedures in the method in the foregoing embodiments may be implemented by computer-readable instructions instructing related hardware, the program may be stored in a non-volatile computer readable storage medium, and when the program is executed, the procedures in the foregoing method embodiments may be implemented. Any reference to a memory, a storage, a database, or other mediums in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache memory. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM), and the like.

The technical features in the foregoing embodiments may be randomly combined. For concise description, not all possible combinations of the technical features in the embodiment are described. However, as long as combinations of the technical features do not conflict with each other, the combinations of the technical features should be considered as falling within the scope described in this specification.

The foregoing embodiments show only several implementations of this application with detailed illustrations. However, the descriptions provided herein shall not be understood as limiting the patent scope of this application. It should be noted that a person of ordinary skill in the art may further make several variations and improvements without departing from the idea of this application, and the variations and improvements all fall within the protection scope of this application. Therefore, the patent protection scope of this application shall be determined based on the appended claims.

What is claimed is:

1. A video transcoding method, comprising:
obtaining, by a computer device, at least one initial quantization parameter used to encode at least one initial coding unit for generating an initial compressed video;
determining, by the computer device according to the at least one initial quantization parameter, a current reference quantization parameter corresponding to a current coding unit in a current video frame that is generated by decoding the initial compressed video;
determining, by the computer device, an estimated quantization parameter for encoding the current coding unit;
determining, by the computer device, a first difference between the current reference quantization parameter and the estimated quantization parameter;
determining whether the first difference is greater than a threshold;
in response to the first difference being determined as not greater than the threshold,
setting a target quantization parameter to be the estimated quantization parameter;
in response to the first difference being determined as greater than the threshold,
calculating a quantization parameter increment that is proportional to the first difference, and
setting the target quantization parameter to be a summation of the estimated quantization parameter and the quantization parameter increment; and
encoding, by the computer device, the current coding unit according to the target quantization parameter.

2. The method according to claim 1, wherein
the obtaining the at least one initial quantization parameter comprises:
obtaining, by the computer device, a target initial decoded frame matching the current video frame;
obtaining, by the computer device, a target initial coding unit matching the current coding unit in the target initial decoded frame; and
obtaining an initial quantization parameter used to encode the target initial coding unit, and
the determining the current reference quantization parameter comprises:
determining, by the computer device according to the initial quantization parameter used to encode the target initial coding unit, the current reference quantization parameter corresponding to the current coding unit.

3. The method according to claim 1, wherein
the obtaining the at least one initial quantization parameter comprises:
obtaining, by the computer device, a target initial decoded frame matching the current video frame; and
obtaining, by the computer device, initial quantization parameters used to encode initial coding units in the target initial decoded frame, and
the determining the current reference quantization parameter comprises:
sorting, by the computer device, the initial quantization parameters according to an ascending or descending order to obtain a sorted result; and
determining, according to the sorted result, the current reference quantization parameter.

4. The method according to claim 3, wherein the determining, according to the sorted result, the current reference quantization parameter comprises:
determining, by the computer device, a smallest one of the initial quantization parameters as the current reference quantization parameter.

5. The method according to claim 1, wherein the determining the current reference quantization parameter comprises:
identifying an initial video coding standard corresponding to the initial compressed video;
identifying a current video coding standard corresponding to encoding the current video frame;
determining, by the computer device, a mapping relationship of a first quantization parameter according to the initial video coding standard and a second quantization parameter according to the current video coding standard; and
obtaining, by the computer device, the current reference quantization parameter according to the initial quantization parameter and the mapping relationship.

6. The method according to claim 1, wherein the calculating the quantization parameter increment comprises:
obtaining, by the computer device, a current adjustment coefficient; and
calculating the quantization parameter increment according to a multiplication of the current adjustment coefficient and the first difference.

7. The method according to claim 6, further comprising:
determining, by the computer device, an average reference quantization parameter of initial quantization parameters used to encode an initial video frame that corresponds to the current video frame,
wherein the obtaining the current adjustment coefficient comprises:
calculating, by the computer device, a second difference between the average reference quantization parameter and the current reference quantization parameter; and
calculating, by the computer device, the current adjustment coefficient according to the second difference, the current adjustment coefficient and the second difference being positively correlated.

8. The method according to claim 7, wherein the determining the average reference quantization parameter comprises:
obtaining, by the computer device, initial quantization parameters used to encode coding units in the initial video frame;
calculating an average value of the initial quantization parameters used to encode the coding units in the initial video frame; and
determining, by the computer device, the average value as the average reference quantization parameter.

9. The method according to claim 6, further comprising:
  determining, by the computer device, a frame average reference quantization parameter of quantization parameters used to encode coding units in the current video frame for generating the initial compressed video;
  determining, by the computer device, a video average reference quantization parameter of quantization parameters used to encode coding units in plural video frames for generating the initial compressed video;
  when a third difference between the video average quantization parameter and the frame average quantization parameter is greater than a preset parameter, classifying, by the computer device, the current video frame as a first type of video frame; and
  when the third difference between the video average quantization parameter and the frame average quantization parameter is less than or equal to the preset parameter, classifying, by the computer device, the current video frame as a second type of video frame,
  wherein the obtaining the current adjustment coefficient comprises:
    when the current video frame is classified as the first type of video frame, obtaining, by the computer device, a first adjustment coefficient as the current adjustment coefficient; and
    when the current video frame is classified as the second type of video frame, obtaining, by the computer device, a second adjustment coefficient as the current adjustment coefficient.

10. A computer device, comprising:
  processing circuitry configured to:
    obtain at least one initial quantization parameter used to encode at least one initial coding unit for generating an initial compressed video;
    determine, according to the at least one initial quantization parameter, a current reference quantization parameter corresponding to a current coding unit in a current video frame that is generated by decoding the initial compressed video;
    determine an estimated quantization parameter for encoding the current coding unit;
    determine a first difference between the current reference quantization parameter and the estimated quantization parameter;
    determine whether the first difference is greater than a threshold;
    in response to the first difference being determined as not greater than the threshold,
      set a target quantization parameter to be the estimated quantization parameter;
    in response to the first difference being determined as greater than the threshold,
      calculate a quantization parameter increment that is proportional to the first difference, and
      set the target quantization parameter to be a summation of the estimated quantization parameter and the quantization parameter increment; and
    encode the current coding unit according to the target quantization parameter.

11. The computer device according to claim 10, wherein the processing circuitry is configured to:
  obtain a target initial decoded frame matching the current video frame;
  obtain a target initial coding unit matching the current coding unit in the target initial decoded frame;
  obtain an initial quantization parameter used to encode the target initial coding unit; and
  determine, according to the initial quantization parameter used to encode the target initial coding unit, the current reference quantization parameter corresponding to the current coding unit.

12. The computer device according to claim 10, wherein the processing circuitry is configured to:
  obtain a target initial decoded frame matching the current video frame; and
  obtain initial quantization parameters used to encode initial coding units in the target initial decoded frame; and
  sort the initial quantization parameters according to an ascending or descending order to obtain a sorted result; and
  determine, according to the sorted result, the current reference quantization parameter.

13. The computer device according to claim 12, wherein the processing circuitry is configured to:
  determine a smallest one of the initial quantization parameters as the current reference quantization parameter.

14. The computer device according to claim 10, wherein the processing circuitry is configured to:
  identify an initial video coding standard corresponding to the initial compressed video;
  identify a current video coding standard corresponding to encoding the current video frame;
  determine a mapping relationship of a first quantization parameter according to the initial video coding standard and a second quantization parameter according to the current video coding standard; and
  obtain the current reference quantization parameter according to the initial quantization parameter and the mapping relationship.

15. The computer device according to claim 10, wherein the processing circuitry is configured to:
  in response to the first difference being determined as greater than the threshold,
    obtain a current adjustment coefficient, and
    calculate the quantization parameter increment according to a multiplication of the current adjustment coefficient and the first difference.

16. The computer device according to claim 15, wherein the processing circuitry is configured to:
  determine an average reference quantization parameter of initial quantization parameters used to encode an initial video frame that corresponds to the current video frame,
  calculate a second difference between the average reference quantization parameter and the current reference quantization parameter; and
  calculate the current adjustment coefficient according to the second difference, the current adjustment coefficient and the second difference being positively correlated.

17. The computer device according to claim 16, wherein the processing circuitry is configured to:
  obtain initial quantization parameters used to encode coding units in the initial video frame;
  calculate an average value of the initial quantization parameters used to encode the coding units in the initial video frame; and
  determine the average value as the average reference quantization parameter.

18. The computer device according to claim 15, wherein the processing circuitry is configured to:

determine a frame average reference quantization parameter of quantization parameters used to encode coding units in the current video frame for generating the initial compressed video;

determine a video average reference quantization parameter of quantization parameters used to encode to coding units in plural video frames for generating the initial compressed video;

when a third difference between the video average quantization parameter and the frame average quantization parameter is greater than a preset parameter, classify the current video frame as a first type of video frame;

when the third difference between the video average quantization parameter and the frame average quantization parameter is less than or equal to the preset parameter, classify the current video frame as a second type of video frame;

when the current video frame is classified as the first type of video frame, obtain a first adjustment coefficient as the current adjustment coefficient; and when the current video frame is classified as the second type of video frame, obtain a second adjustment coefficient as the current adjustment coefficient.

19. A non-transitory computer-readable storage medium storing computer-readable instructions, which when executed by one or more processors, cause the one or more processors to perform:

obtaining at least one initial quantization parameter used to encode at least one initial coding unit for generating an initial compressed video;

determining, according to the at least one initial quantization parameter, a current reference quantization parameter corresponding to a current coding unit in a current video frame that is generated by decoding the initial compressed video;

determining an estimated quantization parameter for encoding the current coding unit;

determining a first difference between the current reference quantization parameter and the estimated quantization parameter determining whether the first difference is greater than a threshold;

in response to the first difference being determined as not greater than the threshold,
setting a target quantization parameter to be the estimated quantization parameter;

in response to the first difference being determined as greater than the threshold,
calculating a quantization parameter increment that is proportional to the first difference, and
setting the target quantization parameter to be a summation of the estimated quantization parameter and the quantization parameter increment; and encoding the current coding unit according to the target quantization parameter.

20. The non-transitory computer-readable storage medium according to claim 19, wherein
the obtaining the at least one initial quantization parameter comprises:
obtaining a target initial decoded frame matching the current video frame;
obtaining a target initial coding unit matching the current coding unit in the target initial decoded frame; and
obtaining an initial quantization parameter used to encode the target initial coding unit, and
the determining the current reference quantization parameter comprises:
determining, according to the initial quantization parameter used to encode the target initial coding unit, the current reference quantization parameter corresponding to the current coding unit.

21. The non-transitory computer-readable storage medium according to claim 19, wherein the calculating the quantization parameter increment comprises:
obtaining, by the computer device, a current adjustment coefficient; and
calculating the quantization parameter increment according to a multiplication of the current adjustment coefficient and the first difference.

* * * * *